(12) United States Patent
Kino et al.

(10) Patent No.: US 8,360,466 B2
(45) Date of Patent: Jan. 29, 2013

(54) SIDE AIRBAG APPARATUS

(75) Inventors: Masao Kino, Kiyosu (JP); Minoru Ono, Kiyosu (JP); Eiji Sato, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/329,491

(22) Filed: Dec. 19, 2011

(65) Prior Publication Data

US 2012/0242067 A1   Sep. 27, 2012

(30) Foreign Application Priority Data

Mar. 22, 2011   (JP) .................................. 2011-063197

(51) Int. Cl.
*B60R 21/16*   (2006.01)
(52) U.S. Cl. .................................................... 280/730.2
(58) Field of Classification Search ............... 280/730.2, 280/729, 743.1
See application file for complete search history.

(56) References Cited

U.S. PATENT DOCUMENTS

| | | | |
|---|---|---|---|
| 6,991,257 B2* | 1/2006 | Zhao et al. ................. | 280/730.2 |
| 7,207,595 B2* | 4/2007 | Kanto et al. ............... | 280/730.2 |
| 7,658,403 B2 | 2/2010 | Kawabe et al. | |
| 7,819,419 B2 | 10/2010 | Hayashi et al. | |
| 7,862,077 B2* | 1/2011 | Yokota ........................ | 280/730.2 |
| 7,946,621 B2* | 5/2011 | Honda et al. ............... | 280/743.2 |
| 8,181,989 B2* | 5/2012 | Okuhara ..................... | 280/730.2 |
| 2003/0168836 A1* | 9/2003 | Sato et al. .................. | 280/730.2 |
| 2012/0235389 A1* | 9/2012 | Suzuki ........................ | 280/730.2 |

FOREIGN PATENT DOCUMENTS

| | | |
|---|---|---|
| JP | A-2008-184159 | 8/2008 |
| JP | A-2009-001057 | 1/2009 |

\* cited by examiner

*Primary Examiner* — Faye M. Fleming
(74) *Attorney, Agent, or Firm* — Posz Law Group, PLC

(57) ABSTRACT

Before a thorax protecting portion of an airbag is altered to a storage mode, at least a part above a gas supply port of the thorax protecting portion is folded along a folding line extending through a thickness limiting portion, so that the thorax protecting portion is partitioned into a main protecting portion, to which the inflation gas is supplied from the gas supply port, and an auxiliary protecting portion, to which the inflation gas is supplied via the main protecting portion. The thickness limiting portion has an arcuate portion that is curved to bulge rearward, and the thickness limiting portion is arranged in the thorax protecting portion such that the rear end of the arcuate portion is located in the auxiliary protecting portion.

4 Claims, 7 Drawing Sheets

Fig.6A Fig.6C
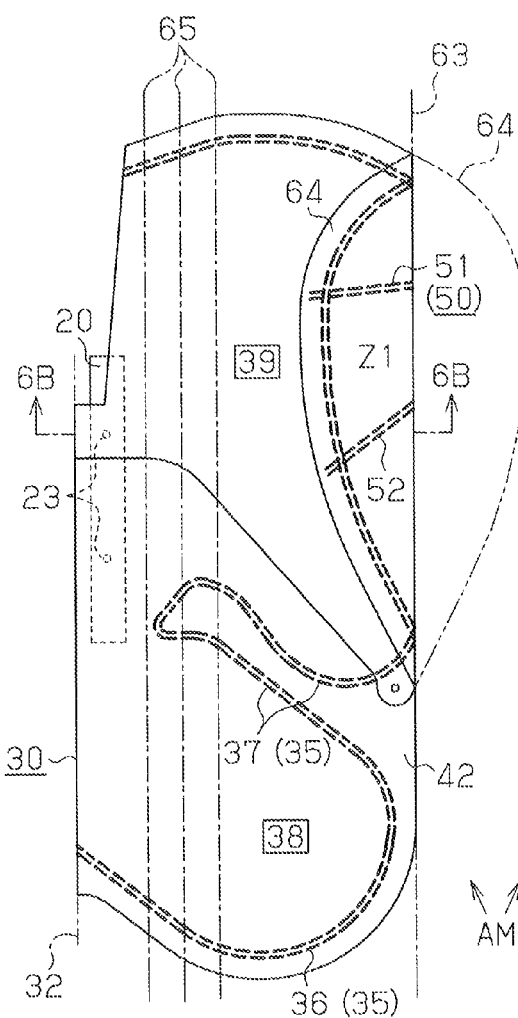
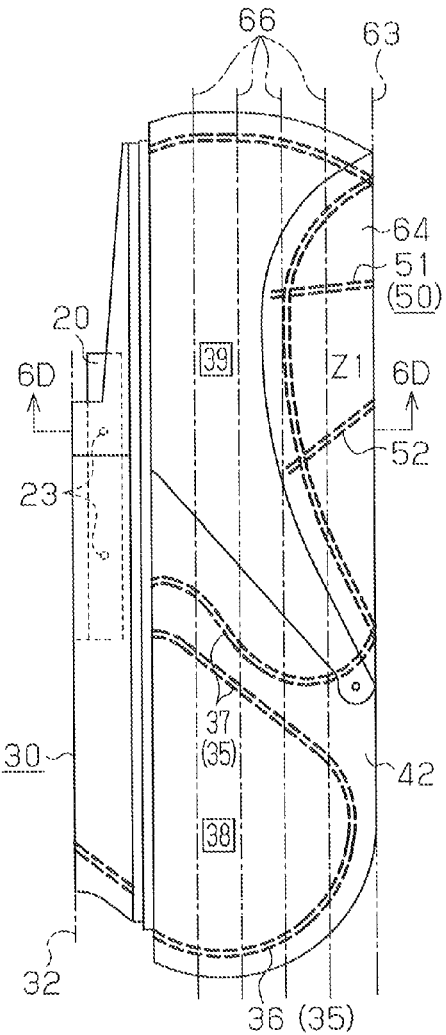
Fig.6B
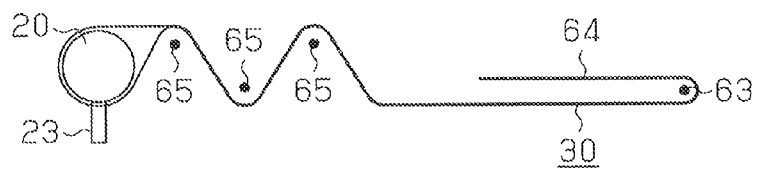
Fig.6D
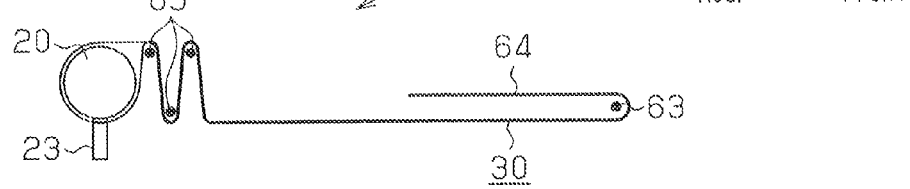

Rear ⟷ Front

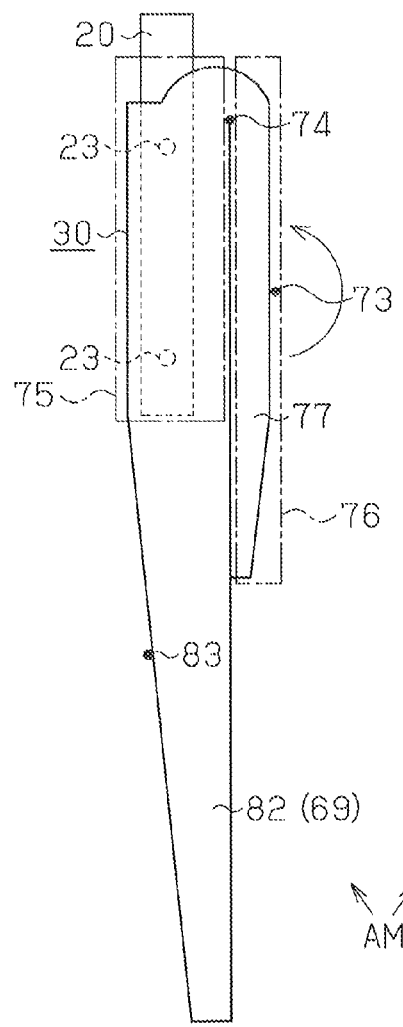
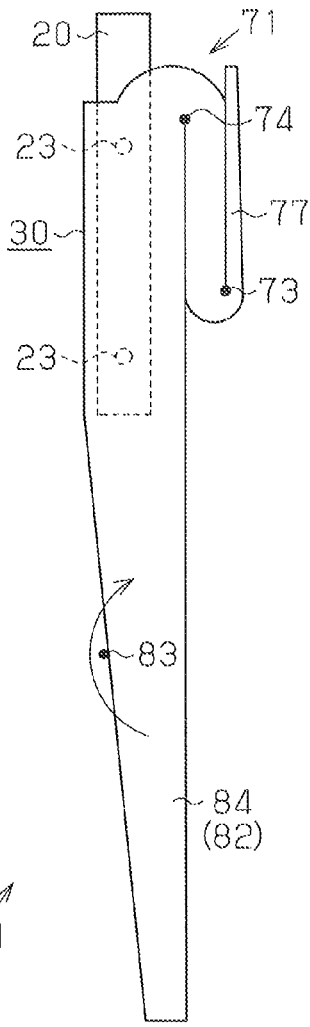
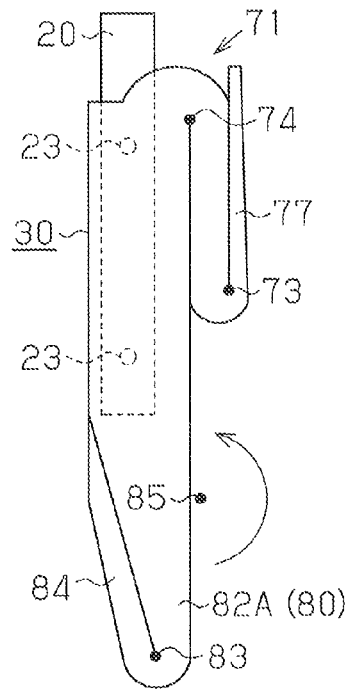
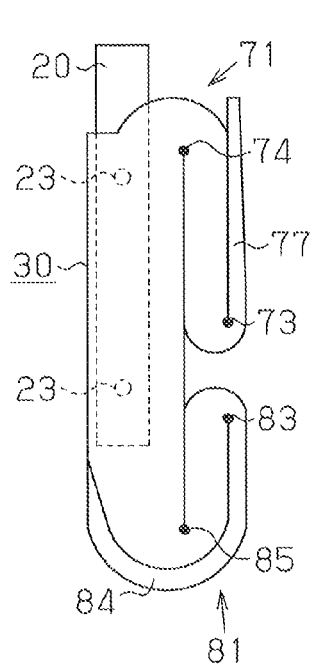

SIDE AIRBAG APPARATUS

BACKGROUND OF THE INVENTION

The present invention relates to a side airbag apparatus that inflates and deploys an airbag beside at least the thorax of an occupant seated in a vehicle seat to reduce an impact applied from the side, thereby protecting the occupant. More specifically, the present invention pertains to a side airbag apparatus that has an airbag with a thickness limiting portion at a part corresponding to an arm of an occupant, and is configured to prevent the arm from being pressed toward the thorax by the airbag.

A side airbag apparatus is widely known that includes an airbag and an inflator and protects an occupant when an impact is applied to a vehicle from a side due to a side collision. In such a side airbag apparatus, the airbag is formed by stacking a pair of fabric portions along the widthwise direction of a vehicle (vehicle widthwise direction) and joining the fabric portions to form a bag-like shape. The inflator is arranged at the rear end of the airbag. After being folded into a compact form for being accommodated, the airbag, together with the inflator, is incorporated in a seat back of a vehicle seat. In the side airbag apparatus, when an impact is applied from the side of a body side portion, such as a side door, of a vehicle, the inflator discharges gas into the airbag. The discharged inflation gas inflates and deploys the airbag forward from the seat back into a narrow space between the occupant seated in the vehicle seat and the body side portion, so that the airbag reduces impact applied to the occupant from the side through the body side portion.

In the side of the human body, lumbar regions are generally known to have a better impact resistance than the thorax. Thus, if, during the inflation and deployment, an airbag pushes an arm of an occupant inward in the widthwise direction of the vehicle seat (toward the thorax), the thorax, which has a relatively low impact resistance, might be pressed by the arm.

In this respect, for example, Japanese Laid-Open Patent Publication Nos. 2008-184159 and 2009-001057 each disclose a side airbag apparatus that has an airbag with a thorax protecting portion for protecting the thorax of an occupant. The thorax protecting portion includes a thickness limiting portion at a part corresponding to an arm of the occupant. The thickness limiting portion is formed by connecting the fabric portions to each other at a position corresponding to an arm of the occupant, while bringing the fabric portions in contact with or close to each other. According to the side airbag apparatus having such a thickness limiting portion, the thickness of the thorax protecting portion along the widthwise direction of the vehicle seat is limited at a position where the thickness limiting portion is provided. It is therefore unlikely that the arm is pressed by the thorax protecting portion and pushes the thorax.

In the above side airbag apparatus, it is preferable that the thorax protecting portion of the airbag be quickly inflated and deployed forward from the compactly folded accommodation state, thereby protecting the thorax of the occupant from an impact at an early stage. Since it is located on the path of the flow of inflation gas from the inflator, the thickness limiting portion adversely influences the deployment and inflation of the thorax protecting portion at an early stage. However, the prior art disclosed in Japanese Laid-Open Patent Publication Nos. 2008-184159 and 2009-001057 does not take such adverse influence into consideration.

SUMMARY OF THE INVENTION

Accordingly, it is an objective of the present invention to provide a side airbag apparatus in which the airbag has a thickness limiting portion in the thorax protecting portion and the thorax protecting portion is quickly inflated and deployed forward.

To achieve the foregoing objective, and in accordance with one aspect of the present invention, a side airbag apparatus is provided that includes an airbag. The airbag includes a thorax protecting portion for protecting the thorax of an occupant seated in a vehicle seat. The airbag is formed by stacking a pair of fabric portions in a widthwise direction of the vehicle seat and joining the fabric portions to form a bag-like shape. The airbag is arranged beside the occupant in a folded state, and is inflated and deployed in a forward direction of the vehicle seat from the folded state. The thorax protecting portion includes a gas supply port and a thickness limiting portion. The gas supply port supplies the inflation gas to the thorax protecting portion, thereby inflating the thorax protecting portion. The thickness limiting portion is formed by connecting the fabric portions to each other after bringing the fabric portions into one of a state in which the fabric portions contact with each other and a state in which the fabric portions are close to each other, at a position that is forward of the gas supply port and that corresponds to an arm of the occupant. The thickness limiting portion limits the thickness of the thorax protecting portion in the widthwise direction of the vehicle seat, to prevent the thorax protecting portion from pushing the arm toward the thorax. The thickness limiting portion has an arcuate portion that is curved to bulge toward a rear portion of the airbag. The thorax protecting portion is folded back along a folding line to be partitioned into a main protecting portion, to which the inflation gas is supplied from the gas supply port, and an auxiliary protecting portion, to which the inflation gas is supplied via the main protecting portion. Before the airbag is folded, the folding line is located above the gas supply port and extends through the thickness limiting portion, and the rear end of the arcuate portion of the thickness limiting portion is located in the auxiliary protecting portion.

In accordance with another aspect of the present invention, a method for folding an airbag used in a side airbag apparatus is provided. The airbag includes a thorax protecting portion for protecting the thorax of an occupant seated in a vehicle seat. The airbag is formed by stacking a pair of fabric portions in a widthwise direction of the vehicle seat and joining the fabric portions to form a bag-like shape. The thorax protecting portion includes a gas supply port and a thickness limiting portion. The gas supply port supplies inflation gas to the thorax protecting portion, thereby inflating the thorax protecting portion. The thickness limiting portion is formed by connecting the fabric portions to each other after bringing the fabric portions into one of a state in which the fabric portions contact with each other and a state in which the fabric portions are close to each other, at a position that is forward of the gas supply port and that corresponds to an arm of the occupant. The thickness limiting portion limits the thickness of the thorax protecting portion in the widthwise direction of the vehicle seat. The thickness limiting portion has an arcuate portion that is curved to bulge toward a rear portion of the airbag. The method includes: forming an elongated body that extends in an up-down direction of the vehicle seat by folding the airbag; and folding, along a folding line, an upper portion of the elongated body in a downward direction, such that the folding line is located above the gas supply port and extends through the thickness limiting portion, and such that a rear end of the arcuate portion of the thickness limiting portion is located in the upper portion of the elongated body.

According to the above configuration, the gas supply port of the gas supply source is located in the main protecting portion of the thorax protecting portion of the airbag, and at least a part of the thickness limiting portion that is located lower than the rear end of the arcuate portion is located in the main protecting portion. The rear end of the arcuate portion is not located in the main protecting portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6A is a side view schematically showing the airbag module in one stage of folding of the airbag;

FIG. 6B is a cross-sectional view taken along line 6B-6B of FIG. 6A;

FIG. 6C is a side view schematically showing the airbag module in one stage of folding of the airbag;

FIG. 6D is a cross-sectional view taken along line 6D-6D of FIG. 6C;

FIGS. 8A to 8C are side views schematically showing the airbag module in one stage of folding of the airbag;

FIG. 8D is a side view schematically showing the airbag module in a state where the folding of the airbag is complete.

DETAILED DESCRIPTION OF THE PREFERRED EMBODIMENTS

One embodiment of the present invention will now be described with reference to the drawings.

In the following, the direction in which a vehicle advances forward will be referred to as the front (front of the vehicle), and the reverse direction will be referred to as the rear (rear of the vehicle). Also, the up-down direction refers to the up-down direction of the vehicle, and the left-right direction refers to the widthwise direction of the vehicle, that is, the left and right direction when the vehicle is advancing forward.

Figure 1:
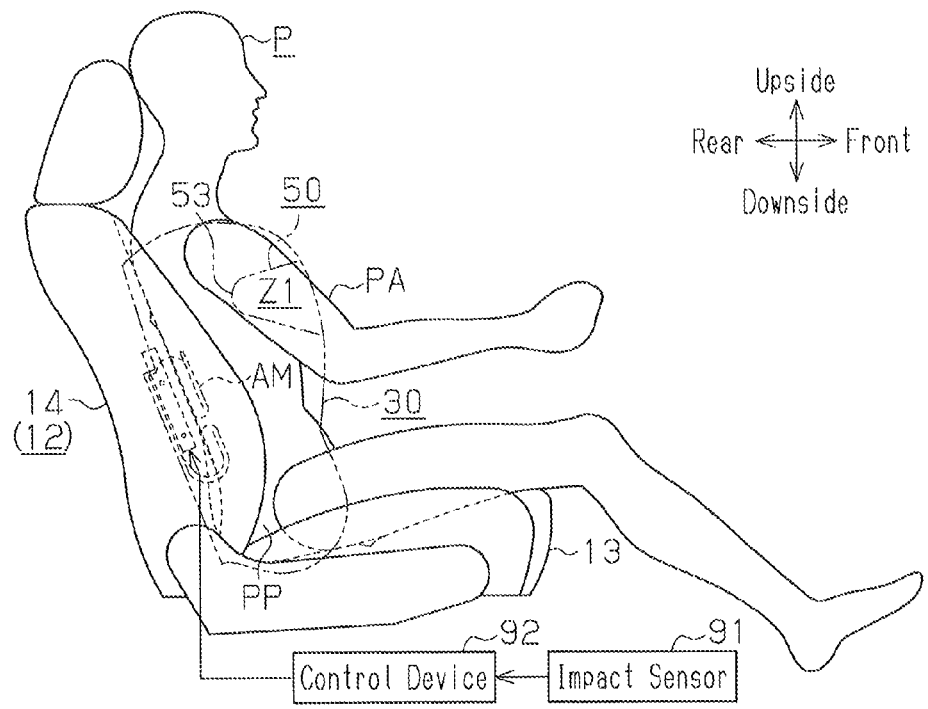
FIG. 1 is a schematic side view illustrating, together with an occupant, a vehicle seat to which a side airbag apparatus according to one embodiment of the present invention is mounted.
Figure 2:
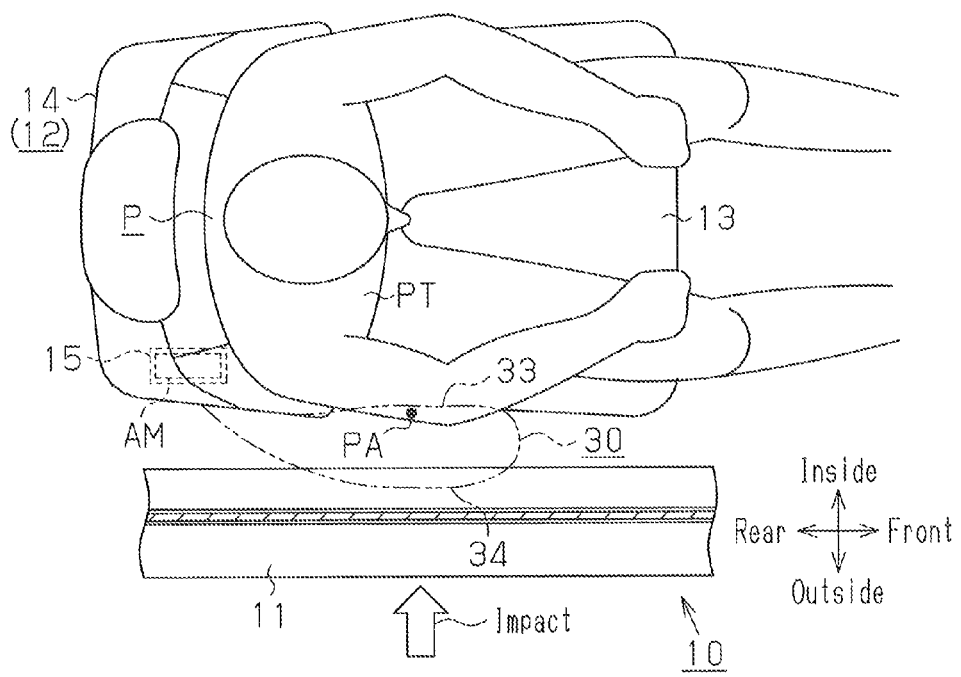
FIG. 2 is a schematic plan view showing, together with an occupant, the positional relationship between the vehicle seat and a body side portion.
Figure 3:
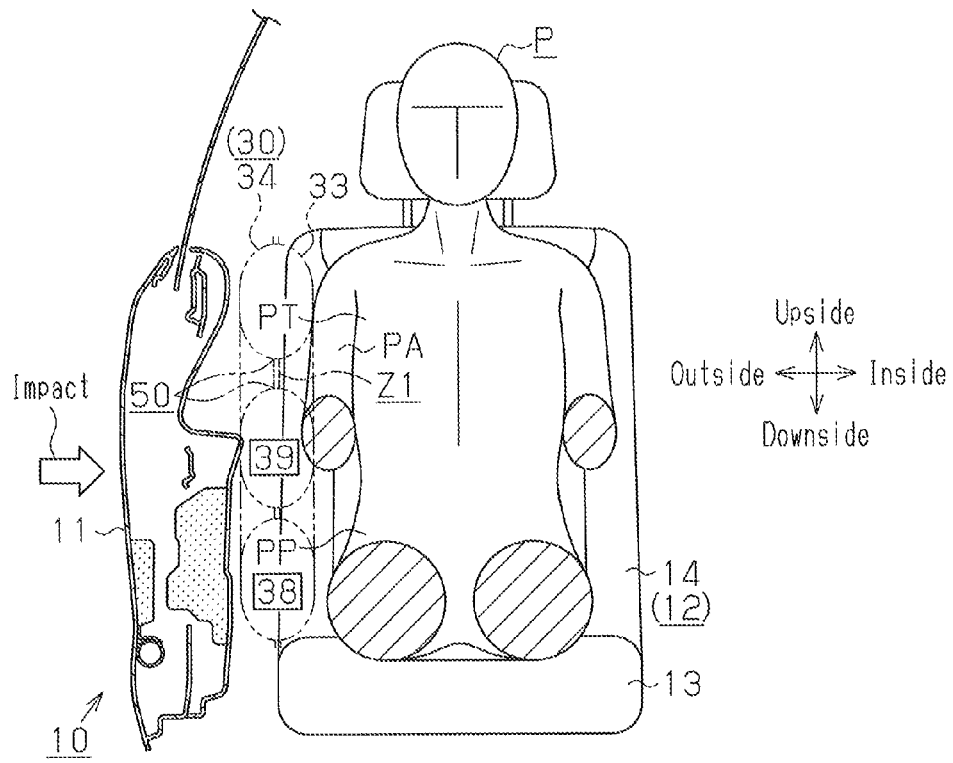
FIG. 3 is a schematic front cross-sectional view showing, together with an occupant; the positional relationship between the vehicle seat and the body side portion.

As shown in FIGS. 1 to 3, a vehicle seat 12 is arranged on the inner side (the upper side as viewed in FIG. 2, and the right side as viewed in FIG. 3) of a body side portion 11 of a vehicle 10. The body side portion 11 refers to members that are located in a side of the vehicle 10, and mainly corresponds to doors and pillars. For example, part of the body side portion 11 corresponding to the front seat includes a front door, a center pillar (B-pillar), and the like. Part of the body side portion 11 corresponding to the rear seat includes a rear part of the side door (rear door), a C-pillar, a front part of the wheel well, a rear quarter, and the like.

The vehicle seat 12 includes a seat cushion (seat portion) 13 and a seat back (backrest portion) 14. The seat back 14 extends upward from the rear end of the seat cushion 13 and includes a tilt adjusting mechanism (not shown). The vehicle seat 12 is arranged in the vehicle 10 such that the seat back 14 faces forward. The widthwise direction of the vehicle seat 12 thus arranged agrees with the vehicle widthwise direction.

A storage portion 15 is provided in a side of the seat back 14 that is located closer to the outside of the vehicle (refer to FIG. 2). The storage portion 15 accommodates an airbag module AM, which forms a main part of the side impact airbag apparatus. The storage portion 15 is located in the vicinity of an outer side of an occupant P seated in the vehicle seat 12. The airbag module AM includes as its main components an inflator assembly 20 and an airbag 30 as shown in FIG. 4.

Each of the components will now be described. In the present embodiment, the up-down direction and the front-rear direction of the airbag module AM and its components are defined with reference to the seat back 14 of the vehicle seat 12. A direction along which the seat back 14 stands is defined as the up-down direction, and a direction that is perpendicular to the up-down direction and extends substantially along the vehicle front-rear direction is defined as a front-rear direction. Since the seat back 14 is normally inclined downward toward the front end, the up-down direction is not strictly the vertical direction, but is slightly inclined. Likewise, the front-rear direction is not strictly a horizontal direction, but is slightly inclined.

<Inflator Assembly 20>

Figure 4:
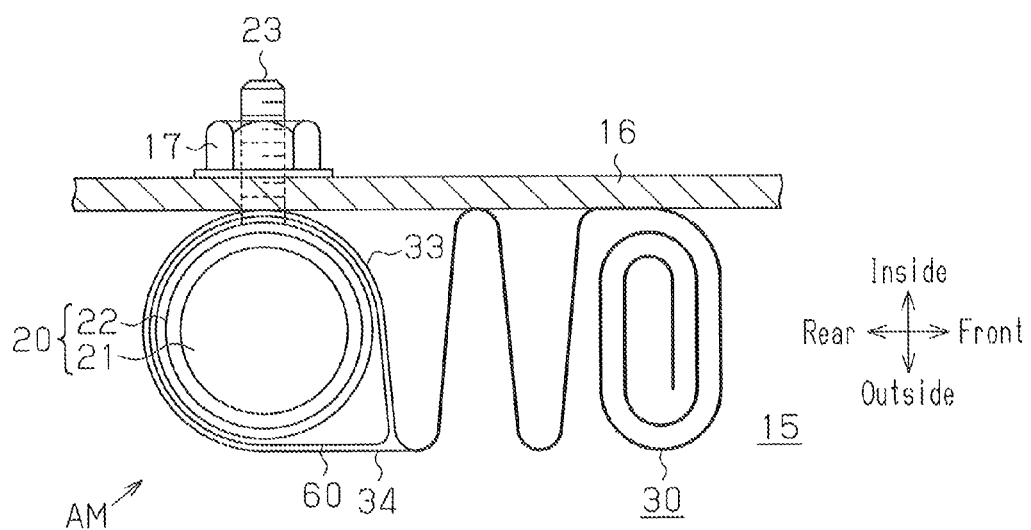
FIG. 4 is a schematic cross-sectional plan view showing the airbag module as viewed from above.
Figure 5:
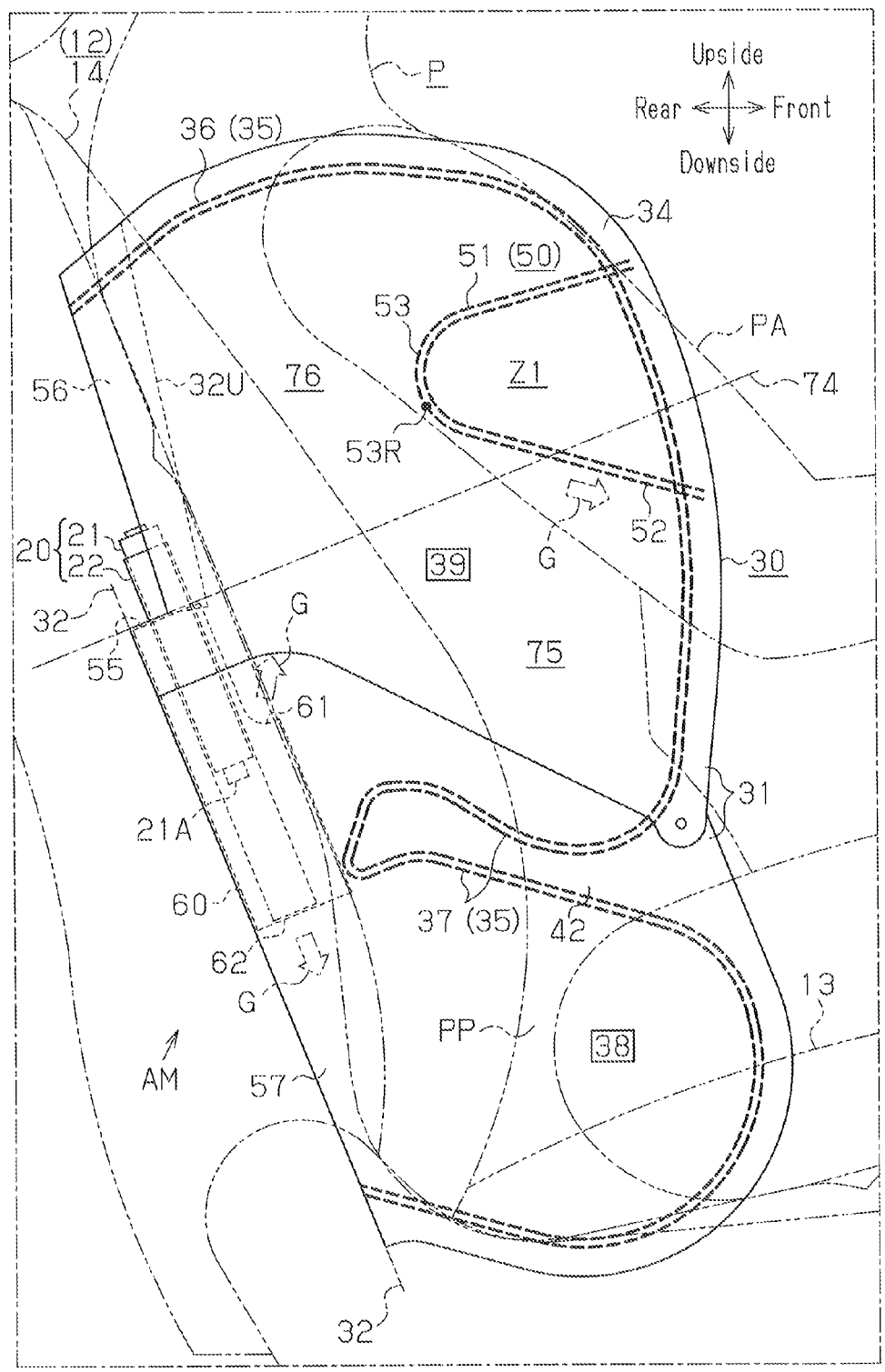
FIG. 5 is a side view schematically showing, together with an occupant, the airbag module in a state where the airbag is deployed without being filled with inflation gas.

As shown in FIGS. 4 and 5, the inflator assembly 20 includes a gas supply source, which is an inflator 21, and a retainer 22 mounted on the outer surface of the inflator 21. A pyrotechnic inflator is used as the inflator 21. The inflator 21 is substantially formed like a thin column extending along the up-down direction. The inflator 21 accommodates gas generating agent (not shown) for generating inflation gas. A gas outlet 21A is provided at the lower end of the inflator 21. Inflation gas G generated by the inflator 21 is jetted radially outward through the gas outlet 21A. A harness (not shown), which is wiring for applying control signals to the inflator 21, is connected to an upper portion of the inflator 21.

In place of a pyrotechnic inflator using the gas generating agent, it is possible to use, as the inflator 21, a hybrid type inflator, which breaks a partition wall of a high-pressure gas cylinder filled with a high-pressure gas by a low explosive to jet out gas.

On the other had, the retainer 22 functions as a diffuser and secures the inflator 21 to the side frame 16 in the seat back 14 together with the airbag 30 (see FIG. 4). Most part of the retainer 22 is a plate made of a material such as metal, and is formed into a long slender cylinder extending in the up-down direction, for example, through bending. A window (not shown) for exposing a part of the gas outlet 21A of the inflator 21 is provided in a front section of the retainer 22.

A plurality of (two, in this embodiment) bolts 23 are fixed to the retainer 22. The bolts 23 are securing members for attaching the retainer 22 to the side frame 16. In other words, the bolts 23 are indirectly fixed to the inflator 21 by means of the retainer 22.

Alternatively, the inflator assembly 20 may include an inflator 21 and a retainer 22 that are formed integrally.

<Airbag 30>

The airbag 30, which is shown in FIGS. 1 to 3, is accommodated in the storage portion 15 in a folded state. The airbag 30 is configured to protect an occupant P seated in the vehicle seat 12. When activated, the airbag 30 is caused to pop out substantially forward from the storage portion 15 with a part (a rear portion) thereof remaining in the storage portion 15 by the inflation gas G from the inflator 21, while being unfolded. Further, the airbag 30 is inflated and deployed in a space between the occupant P and the body side portion 11 to restraining the occupant P, thereby protecting the occupant P from the impact.

FIG. 5 schematically shows the airbag module AM in a state where the airbag 30 is spread without being filled with the inflation gas G (referred to as a flatly deployed state). The airbag 30 is formed by folding each of upper and lower fabric panels (also referred to as base fabric sheets) 31 into half along a folding line 32 in a center portion onto itself with respect to the widthwise direction of the vehicle seat 12 (vehicle widthwise direction), and joining the stacked portions.

When the two stacked portions of the airbag 30 need to be distinguished, a part that is closer to the occupant P (inside of the vehicle) when inflated will be referred to as an inner side fabric portion 33, and a part located on the opposite side of the inner side fabric portion 33 to the occupant P will be referred to as an outer side fabric portion 34. In the fabric panels 31, the outer shapes of the fabric portions 33, 34 are symmetrical with respect to the folding line 32.

The fabric panels 31 are preferably formed of a material having high strength and flexibility and can be easily folded. The material may be, for example, woven cloth formed of polyester threads or polyamide threads. The fabric portions 33, 34 have such size and shape that, when the airbag 30 is inflated and deployed, it occupies a large area spreading over the lumbar region PP and the thorax PT of the occupant P seated in the vehicle seat 12.

As shown in FIGS. 3 and 5, the fabric portions 33, 34 are joined to each other at a joint portion 35. Most of the joint portion 35 is formed by a peripheral joint portion 36 that is formed by sewing the peripheral portions of the fabric portions 33, 34 with sewing threads. The remainder of the joint portion 35 is formed by a partitioning portion 37 that partitions the airbag 30 into a plurality of inflation portions. The inflation portions partitioned by the partitioning portion 37 include a lumbar region protecting portion 38 and a thorax protecting portion 39. The partitioning portion 37 inclined such that the front part is located downward.

The lumbar region protecting portion 38 is formed by a part of the airbag 30 that is below the partitioning portion 37. The lumbar region protecting portion 38 is inflated on the outer side of the lumbar region PP of an occupant P (adult), who has a normal built and is sitting in the vehicle seat 12 in a normal position, thereby protecting the lumbar region PP.

The thorax protecting portion 39 is formed by a part of the airbag 30 that is above the partitioning portion 37. The thorax protecting portion 39 is inflated on the outer side of the thorax PT of the occupant P (adult), who has a normal built and is sitting in the vehicle seat 12 in a normal position, thereby protecting the thorax PT.

Parts of the fabric portions 33, 34 that are encompassed by the partitioning portion 37 constitute a non-expansion portion 42, which is not inflated by the inflation gas G.

Alternatively, the airbag 30 may be formed by a pair of independent fabric panels 31. In this case, the independent fabric panels 31 are stacked onto each other with respect to the vehicle widthwise direction and joined to each other to form a bag-like shape. One of the fabric panels 31 forms one side of the airbag 30, which is closer to the occupant P (inside of the vehicle), is referred to as an inner side fabric portion 33. The other fabric panel 31 forms the outer side of the airbag 30 and is referred to as an outer side fabric portion 34. The joint portion 35 may be formed by a method other than sewing using sewing threads as shown above. For example, the joint portion 35 may be formed by using an adhesive. Further, the joint portion 35 may be provided in a single line or two or more lines. In this embodiment, the joint portion 35 is provided in two lines. The above described possible modifications (the joint portion 35 may be formed by adhesive, and the number of lines of the joint portion 35 may be changed) is applicable to a thickness limiting portion 50 discussed below.

In the thorax protecting portion 39 of the airbag 30 in a flatly deployed state, the thickness limiting portion 50 is provided in a part that corresponds to an arm PA of the occupant P. The thickness limiting portion 50 is formed in the thorax protecting portion 39 by connecting the fabric portions 33, 34 to each other at a position corresponding to the arm PA, after bringing the fabric portions 33, 34 in contact with or close to each other. The thickness limiting portion 50 limits the thickness of the thorax protecting portion 39 along the widthwise direction of the vehicle seat 12 (vehicle widthwise direction), thereby preventing the arm PA from being strongly pressed inward in the widthwise direction (toward the thorax PT) by the thorax protecting portion 39. In this embodiment, the thickness limiting portion 50 is formed by sewing the fabric portions 33, 34 together with sewing threads in a state where the fabric portions 33, 34 are brought into contact. The "state where the fabric portions 33, 34 are brought into contact" includes a state where reinforcing fabric sheets are stacked inside of the fabric portions 33, 34, so that the reinforcing sheets are held between the fabric portions 33, 34. In this state, the fabric portions 33, 34 are virtually brought into contact with each other.

The thickness limiting portion 50 in the thorax protecting portion 39 is arranged at a position that corresponds to the outer side of the arm PA of the occupant P (adult), who has a normal built and is sitting in the vehicle seat 12 in a normal position. The normal position refers to, for example, the position of the driving occupant P when holding the steering wheel.

The thickness limiting portion 50 includes an upper straight portion 51, a lower straight portion 52, and an arcuate portion 53 having a substantially semi-circular shape. The upper straight portion 51 forms the upper edge of the thickness limiting portion 50. In this embodiment, the upper straight portion 51 is inclined upward by a constant angle toward the front end. The front end of the upper straight portion 51 intersects with the peripheral joint portion 36. The lower straight portion 52 forms the lower edge of the thickness limiting portion 50. In this embodiment, the lower straight portion 52 is located beside the arm PA of the occupant P and is inclined downward by a constant angle toward the front end. The front end of the lower straight portion 52 intersects with the peripheral joint portion 36. The arcuate portion 53 is curved to bulge toward a rear portion of the airbag. The arcuate portion 53 connects the upper straight portion 51 and the lower straight portion 52 to each other. The thickness limiting portion 50, which includes the upper straight portion 51, the lower straight portion 52, and the arcuate portion 53, is substantially C-shaped as viewed from the side. The rear end 53R of the arcuate portion 53 is located at the rearmost position of the thickness limiting portion 50. The rear end 53R is located in an auxiliary protecting portion 76 of the thorax protecting portion 39 (the rear end 53R is not located in a main protecting portion 75). The main and auxiliary protecting portions 75, 76 will be described below.

An inflator insertion port 55 is formed in a rear portion of the thorax protecting portion 39 at a position rearward of the lower straight portion 52 of the thickness limiting portion 50. The inflator insertion portion 55 extends along a direction intersecting the folding line 32 (in this embodiment, a direction perpendicular to the folding line 32). The inflator insertion portion 55 is formed as a slit in an upper portion of the fabric panels 31 and extends throughout both fabric portions 33, 34. The folding line 32 is divided into upper and lower sections by the inflator insertion port 55. A part of the divided folding line 32, in this embodiment, a part above the inflator insertion port 55, is referred to as an upper folding line 32U.

Parts of the fabric portions 33, 34 that are located on both sides of the upper folding line 32U are bent along the upper folding line 32U. The direction of folding along the upper folding line 32U is opposite to the direction of folding along the folding line 32. In the fabric portions 33, 34, a part that is folded along the upper folding line 32U will be referred to as an inward folding portion 56, and a part that is folded along the folding line 32 will be referred to as a normally folded portion 57. The inward folding portion 56, which is folded along the upper folding line 32U, is tucked inside of the normally folded portion 57.

An inner tube 60 is arranged in the airbag 30 (in this embodiment, in the thorax protecting portion 39) at a position below the inflator insertion port 55. The inner tube 60 has a cylindrical shape and extends substantially along the up-down direction to regulate the flow of inflation gas G ejected by the inflator 21. Like the fabric panels 31 of the airbag 30, the inner tube 60 is formed by sewing a base fabric such as a woven cloth made of a material having high strength and flexibility to be easily folded. The base fabric for the inner tube 60 may be the same as or different from that of the fabric panels 31 of the airbag 30. For example, woven fabric coated with silicone resin may be used as the base fabric of the inner tube 60.

Most of the inflator assembly 20 is inserted through the inflator insertion port 55 from above and accommodated in the normally folded portion 57 and the inner tube 60. The upper portion of the inflator assembly 20 is exposed to the outside of the normally folded portion 57. The two bolts 23 of the retainer 22 extend through the inner tube 60 and the normally folded portion 57 (the inner fabric portion 33) and are exposed to the outside of the normally folded portion 57 (refer to FIG. 4). The bolts 23 secure the inflator assembly 20, while determining the position of the inflator assembly 20 with respect to the airbag 30.

As described above, the inner tube 60, which covers a part of the inflator assembly 20 in the thorax protecting portion 39 of the airbag 30, has two gas supply ports 61, 62 at a middle portion and at the lower end of the inner tube 60 in the longitudinal direction, respectively. The gas supply ports 61, 62 are used for supplying the inflation gas G discharged from the inflator 21 to the airbag 30. The gas supply port 61 at the middle portion conducts the inflation gas G in the inner tube 60 to an upper front portion of the thorax protecting portion 39. The gas supply port 62 at the lower end conducts the inflation gas G in the inner tube 60 to a lower portion of the lumbar region protecting portion 38.

By folding the airbag 30 in the flatly deployed state in the following manner, the airbag module AM is made into a compact form (storage mode, refer to FIGS. 1 and 8(D)). The storage mode allows the airbag module AM to be readily accommodated in the storage portion 15 having a limited size in the seat back 14.

The storage mode is achieved by folding the airbag 30 in the flatly deployed state shown in FIG. 5 in accordance with a procedure shown in FIGS. 6A to 6D, 7A to 7D, and 8A to 8D. In these drawings, the components are illustrated in a simplified manner.

First, as shown in FIGS. 6A and 6B, a front portion of the airbag 30 in the flatly deployed state is folded back. This creates a folding line 63 extending in the up-down direction in a front portion of the airbag 30. A part 64 forward of the folding line 63 is folded rearward along the folding line 63.

Subsequently, a rear portion of the airbag 30 that is forward of the inflator assembly 20 is accordion-folded as shown in FIGS. 6A, 6B, and 6D. This creates a plurality of accordion-folding lines 65 extending in the up-down direction in the rear portion of the airbag 30. The interval between adjacent pair of the accordion-folding lines 65 is the folding width of the accordion-folding. The airbag 30 is accordion-folded along the accordion-folding lines 65 from the front to the rear in the vicinity of the inflator assembly 20 by the folding width.

Figure 7A:
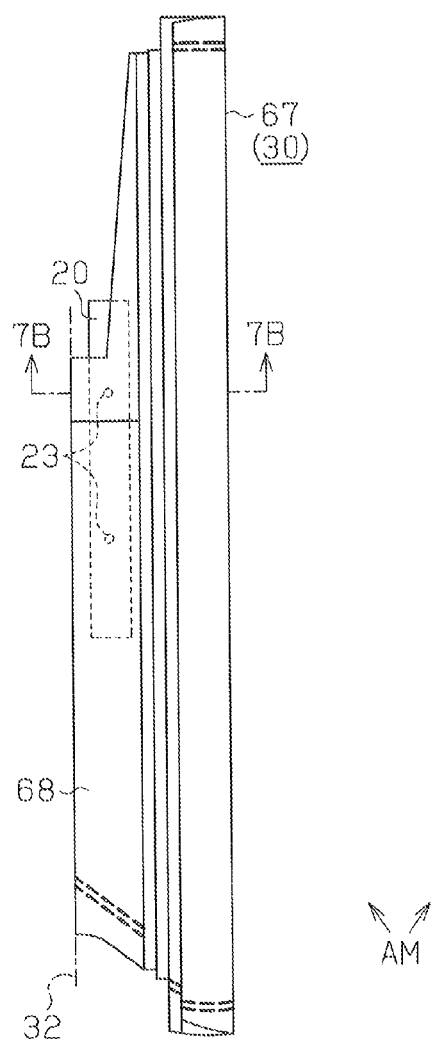
FIG. 7A is a side view schematically showing the airbag module in one stage of folding of the airbag.
Figure 7C:
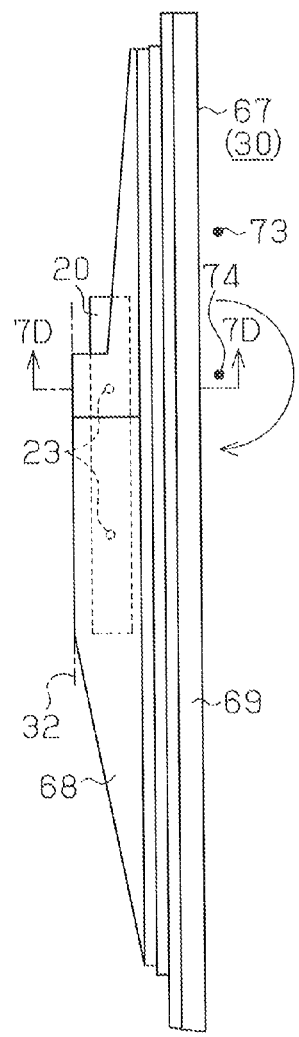
FIG. 7C is a side view schematically showing the airbag module in one stage of folding of the airbag.
Figure 7B:
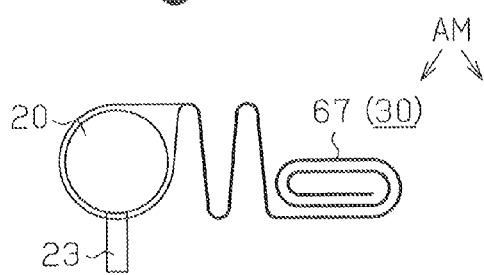
FIG. 7B is a cross-sectional view taken along line 7B-7B of FIG. 7A.
Figure 7D:
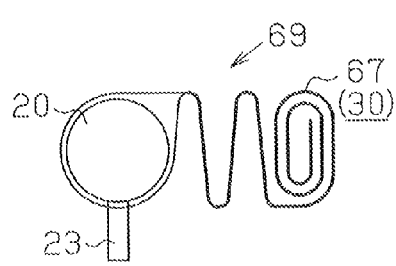
FIG. 7D is a cross-sectional view taken along line 7D-7D of FIG. 7C.

Then, a part of the airbag 30 that is forward of the accordion-folded portion (including the folded back part 64) is folded in a rolling manner. This creates a plurality of roll-folding lines 66 extending in the up-down, direction in the front portion of the airbag 30 as shown in FIG. 6C. As shown in FIGS. 7A and 7B, the front portion is folded in a rolling manner along the roll-folding lines 66 from the front to the rear. The roll-folded portion 67 is rotated such that its wider face lies perpendicular to the front-rear direction as shown in FIGS. 7C and 7D. A part 68 of the airbag 30 that is below the inflator assembly 20 is folded, for example, by inward folding. The inward folding is one method for folding the airbag 30 and performed to fold back an end of the airbag 30 such that the folded back end is located inside of the other portions.

Through the roll folding, the airbag 30 has an intermediate form (hereinafter, an elongated body 69), which has a large dimension in the up-down direction and a small dimension in the front-rear direction.

Further, overlapping portions 71, 81 are formed in an upper portion and a lower portion of the elongated body 69, respectively (see FIG. 8), which reduces the dimension of the elongated body 69 in the up-down direction.

When forming the upper overlapping portion 71, a plurality of (in this embodiment, two) folding lines 73, 74, which extends along the widthwise direction of the vehicle seat 12 (the vehicle widthwise direction) are set for an upper portion of the elongated body 69 in the state of FIG. 7C. The folding line 74 is located below the folding line 73, and meets the following conditions.

(Condition 1) The folding line 74 is located above the gas supply port 61 in a middle portion of the inner tube 60 (see FIG. 5), and (Condition 2) The folding line 74 extends along the front-rear direction and through the thickness limiting portion 50 in the thorax protecting portion 39 of the airbag 30 in the flatly deployed state (see FIG. 5).

An upper portion of the elongated body 69 is folded back downward along the folding line 74 as indicated by an arrow in FIG. 7C. The folding of the upper portion of the elongated body 69 causes the thorax protecting portion 39 to be accommodated in the inflator assembly 20 and the inner tube 60 as shown in FIGS. 5 and 8A. Also, the thorax protecting portion 39 is divided into the main protecting portion 75, which receives the inflation gas G from the gas supply port 61, and the auxiliary protecting portion 76, which receives the inflation gas through the main protecting portion 75. The auxiliary protecting portion 76 is located at the rear end 53R of the arcuate portion 53 in the thickness limiting portion 50.

A part 77 of the auxiliary protecting portion 76 below the folding line 73 is folded back upward as indicated by an arrow in FIG. 8A. By folding back the part 77 in a lower portion of the auxiliary protecting portion 76, the upper overlapping portion 71 is formed as shown in FIG. 8B.

To form the lower overlapping portion 81, a folding line 83 that extends along the vehicle widthwise direction is set at a middle in the up-down direction in a part 82 of the elongated body 69 that is below the inflator assembly 20 (corresponding to the lumbar region protecting portion 38) as shown in FIGS. 8A and 8B. A part 84 below the folding line 83 is folded rearward and upward along the folding line 83 as indicated by an arrow in FIG. 8B. Further, as shown in FIG. 8C, a folding line 85 is set in a part 82A, which has been shortened by folding back the lower part 84. A part below the folding line 85 is folded forward and upward along the folding line 85 as indicated by an arrow in FIG. 8C. These two folding actions form the lower overlapping portion 81 as shown in FIG. 8D, which further reduces the dimension of the airbag 30 along the up-down direction.

However, since the overlapping portions 71, 81 are located forward of the inflator assembly 20, the dimension of the airbag 30 along the front-rear direction is slightly greater than the elongated body 69 shown in FIG. 7C.

In this manner, the airbag module AM is altered to the storage mode shown in FIG. 8D by folding the airbag 30 in the above described manner. In the storage mode, the airbag module AM has small dimensions both in the front-rear direction and in the up-down direction, and is therefore suitable to be accommodated in the narrow storage portion 15.

Thereafter, the overlapping portions 71, 81 of the airbag module AM are maintained in the folded state by maintaining means such as binding tapes (not shown).

The retainer bolts 23 of the airbag module AM in the storage mode are passed through the side frame 16 of the seat back 14 to be fastened and fixed by nuts 17.

As shown in FIG. 1, the side airbag apparatus includes an impact sensor 91 and a control device 92 in addition to the above described airbag module AM. The impact sensor 91 includes, for example, an acceleration sensor, and is provided in the body side portion 11 of the vehicle (see FIG. 2). The impact sensor 91 detects an impact applied to the body side portion 11 from the exterior. The control device 92 controls the operation of the inflator 21 based on a detection signal from the impact sensor 91.

The operation of the above side airbag apparatus will now be described.

As shown in FIG. 5, the gas supply port 61 of the inner tube 60 is located in the main protecting portion 75 of the thorax protecting portion 39 of the airbag 30. A part of the thickness limiting portion 50 that is below the rear end 53R of the arcuate portion 53 is at least partly located in the main protecting portion 75. The rear end 53R of the arcuate portion 53 is not located in the main protecting portion 75, but located in the auxiliary protecting portion 76.

When an impact the magnitude of which is greater than or equal to a predetermined value is applied to the body side portion 11 of the vehicle, the impact sensor 91 detects the impact. In response to the detection signal, the control device 92 outputs a command signal for activating the inflator 21 to the inflator 21. In response to the command signal, the gas generating agent in the inflator 21 generates inflation gas G, which is jetted out from the gas outlet 21A. Some of the discharged inflation gas G is conducted toward a lower portion in the lumbar region protecting portion 38 from the gas supply port 62 of the inner tube 60. Also, some of the discharged inflation gas G is conducted toward an upper and front portion in the thorax protecting portion 39 from the gas supply port 61 of the inner tube 60.

In the airbag 30, the lumbar region protecting portion 38 and the thorax protecting portion 39 are inflated by the supplied inflation gas G, and unfolded (deployed from the folded state).

However, in the thorax protecting portion 39, the thickness limiting portion 50, which is formed by joining a pair of the fabric portions 33, 34 while causing these contact each other, changes the flow direction of the inflation gas G that hits the thickness limiting portion 50.

Therefore, at an early stage of the inflation and deployment of the thorax protecting portion 39, the inflation gas G from the gas supply port 61 first flows through the main protecting portion 75, which has the gas supply port 61.

Figure 9:
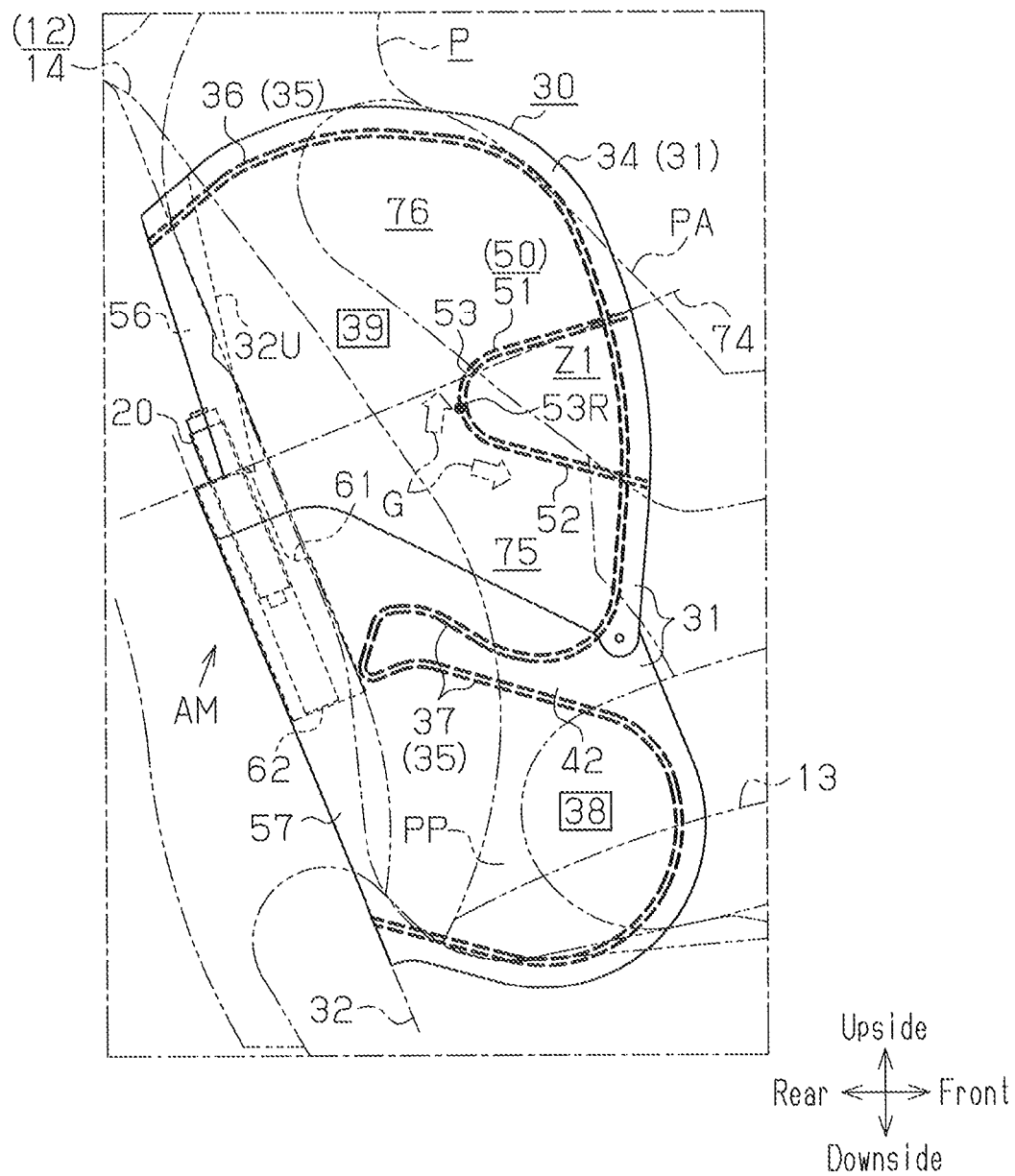
FIG. 9 is a diagram corresponding to FIG. 5 and presents a side view of a comparison example in which the rear end of the arcuate portion is located in the main protecting portion.

If the rear end 53R of the arcuate portion 53 of the thickness limiting portion 50 is located in the main protecting portion 75 as shown in FIG. 9, the inflation gas G that flows from the gas supply port 61 and hits the thickness limiting portion 50 is divided into two streams that flow above and below the rear end 53R of the arcuate portion 53. The stream of the inflation gas G that flows downward is guided to the front and lower portion in the main protecting portion 75 of the thorax protecting portion 39 by the lower straight portion 52 of the thickness limiting portion 50, and inflates and deploys the main protecting portion 75. In contrast, the stream of the inflation gas G that flows upward enters the auxiliary protecting portion 76 of the thorax protecting portion 39 over the folding line 74, and inflates and deploys the auxiliary protecting portion 76. Since some of the inflation gas G enters the auxiliary protecting portion 76, the amount of the inflation gas G that enters the main protecting portion 75 of the thorax protecting portion 39 is reduced, thus delaying the forward inflation and deployment of the main protecting portion 75.

In contrast, according to the present embodiment, the thickness limiting portion 50 is located in the thorax protecting portion 39 such that the rear end 53R of the arcuate portion 53. Thus, the part above the rear end 53R is not located in the main protecting portion 75. Therefore, of the inflation gas G that is supplied to the thorax protecting portion 39 from the gas supply port 61, the part that hits the thickness limiting portion 50 mostly flows below the rear end 53R of the arcuate portion 53 and is guided forward and downward by the lower straight portion 52, to inflate and deploy the main protecting portion 75. A small amount of the inflation gas G is deflected upward by the thickness limiting portion 50 and enters the auxiliary protecting portion 76 over the folding line 74. Therefore, compared to the case where the rear end 53R of the arcuate portion 53 is located in the main protecting portion 75 (FIG. 9), a greater amount of the inflation gas G is supplied to the main protecting portion 75, which allows the main protecting portion 75 to be quickly inflated and deployed forward.

Particularly, in the present embodiment, the lower straight portion 52, which is continuous to the arcuate portion 53 of the thickness limiting portion 50, is inclined downward toward the front by a constant angle relative to the horizontal line. Thus, the inflation gas G that flows from the gas supply port 61 and hits the thickness limiting portion 50 mostly flows below the rear end 53R of the arcuate portion 53, and along the lower straight portion 52 of the thickness limiting portion 50. The inflation gas G thus flows smoothly forward and downward. The inflation gas G quickly and smoothly inflates and deploys the main protecting portion 75 of the thorax protecting portion 39 forward.

As a result, when an impact is applied from the side, the thorax protecting portion 39 of the airbag 30 starts protecting the thorax PT of the occupant P at an early stage. The inflation gas G supplied to the thorax protecting portion 39 from the gas supply port 61 enters the auxiliary protecting portion 76 after passing through the main protecting portion 75. The inflation gas G inflates and deploys the auxiliary protecting portion 76 after the main protecting portion 75.

As described above, the thorax protecting portion 39 of the airbag 30, which is inflated and deployed beside the thorax PT of the occupant P, reduces the impact applied to the thorax PT from the side.

Although not described in detail, the inflation gas G supplied from the gas supply port 62 inflates and deploys the lumbar region protecting portion 38 of the airbag 30 beside the lumbar region PP of the occupant P. The lumbar region protecting portion 38 reduces the impact applied to the lumbar region PP from the side.

In the thorax protecting portion 39 of the airbag 30, the thickness limiting portion 50 is deployed in a part that is beside the thorax PT of the occupant P and corresponds to the arm PA. The thickness of the thickness limiting portion 50 is less than that of the remainder of the airbag 30 along the widthwise direction of the vehicle seat 12 (the vehicle widthwise direction). Therefore, compared to a case where the thorax protecting portion 39 has no thickness limiting portion 50, the arm PA is less likely to be pushed toward thorax PT, and thus the thorax PT, which has relatively low impact resistance, is less likely to be pressed by the arm PA.

Particularly, since the thickness limiting portion 50 is formed by bringing a pair of the fabric portions 33, 34 into contact and joining these, the thickness of the thickness limiting portion 50 is minimized in the thorax protecting portion 39. Therefore, the thorax protecting portion 39 is effectively prevented from pushing the arm PA toward the thorax PT, and the thorax PT is not pushed by the arm PA.

Further, according to this embodiment, when the thorax protecting portion 39 is inflated and deployed, the lower straight portion 52 of the thickness limiting portion 50 is located on the side of the arm PA of the occupant P. A part of the thorax protecting portion 39 that is below the lower straight portion 52 is inflated so that it has an increased thickness in the widthwise direction of the vehicle seat 12 (the vehicle widthwise direction). The arm PA of the occupant P is lifted by this lower part of the thorax protecting portion 39 having the increased thickness. This lifting increases the distance along the up-down direction between the arm PA and thorax PT, further preventing the thorax PT from being pressed by the arm PA. Accordingly, the performance for restraining the thorax PT by the thorax protecting portion 39 is further improved.

The lifting also guides the arm PA of the occupant P to a part of the thickness limiting portion 50 where the thickness is limited (a non-inflated zone Z1 that is surrounded by the thickness limiting portion 50 and the peripheral joint portion 36). At this time, a part of the thorax protecting portion 39 that is above the upper straight portion 51 of the thickness limiting portion 50 is also inflated so that it has an increased thickness in the widthwise direction of the vehicle seat 12 (the vehicle widthwise direction). The part with the increased thickness restricts the upward movement of the arm PA. This allows the arm PA to be retained in a part where the thickness is limited by the thickness limiting portion 50 (the zone Z1).

The present embodiment described above has the following advantages.

(1) In part above the gas supply port 61, the thorax protecting portion 39 is folded back along the folding line 74 extending through the thickness limiting portion 50. Thus, the thorax protecting portion 39 is divided into the main protecting portion 75, to which the inflation gas G is supplied through the gas supply port 61, and the auxiliary protecting portion 76, to which the inflation gas G is supplied through the main protecting portion 75. The thickness limiting portion 50 is arranged in the thorax protecting portion 39 such that the rear end 53R of the arcuate portion 53 is located in the auxiliary protecting portion 76 (FIG. 5).

Accordingly, most of the inflation gas G supplied to the thorax protecting portion 39 through the gas supply port 61 is conducted to the main protecting portion 75 to quickly inflate and deploy the main protecting portion 75 forward, permitting the thorax PT of the occupant P to be protected at an early stage.

(2) The lower end of the thickness limiting portion 50, which is continuous to the arcuate portion 53, is formed by the lower straight portion 52, which is inclined downward toward the front end (FIG. 5).

This allows the inflation gas G that is supplied to the thorax protecting portion 39 from the gas supply port 61 and hits the thickness limiting portion 50 to be conducted to a front part in the main protecting portion 75 by the lower straight portion 52 of the thickness limiting portion 50, so that the thorax protecting portion 39 is smoothly inflated and deployed at an early stage.

The present invention may be modified as in the following additional embodiments.

<Regarding Thickness Limiting Portion 50>

In the above illustrated embodiment, the front ends of the upper straight portion 51 and the lower straight portion 52 of the thickness limiting portion 50 intersect the peripheral joint portion 36, and a part surrounded by the thickness limiting portion 50 and the peripheral joint portion 36 forms the zone Z1, the thickness of which is limited. Alternatively, the thickness limiting portion 50 may be formed annularly, and a part that is surrounded only by the thickness limiting portion 50 may form the zone Z1 of the limited thickness.

In the above illustrated embodiment, the fabric portions 33, 34 are not inflated and have no particular functions in the zone Z1 surrounded by the thickness limiting portion 50 and a part of the peripheral joint portion 36. Therefore, the zone Z1 of the fabric portions 33, 34, which is surrounded by the thickness limiting portion 50 and a part of the peripheral joint portion 36 may be removed. In this case, the corresponding part of only one of the fabric portions 33, 34 may be removed. Alternatively, the corresponding parts of both fabric portions 33, 34 may be removed.

This modification may be applied to a case where the thickness limiting portion 50 is formed annularly, and a zone surrounded by the thickness limiting portion 50 is used as the zone Z1 of the limited thickness.

The zone Z1 that is surrounded by the thickness limiting portion 50 and a part of the peripheral joint portion 36 or the zone Z1 that is surrounded only by the thickness limiting portion 50 may be slightly inflated by the inflation gas G.

That is, regardless of whether or not the zone Z1 is configured to be inflated, the thickness limiting portion 50 may be modified as long as it limits the thickness of the thorax protecting portion 39 along the widthwise direction of the vehicle seat 12 and prevents the arm PA from being pushed toward the thorax PT.

As viewed from the side, the thickness limiting portion 50 may have a shape different from that in the illustrated embodiment. For example, the lower end of the thickness limiting portion 50 may be non-straight. That is, it may be formed to be convex to bulge upward or downward.

The thickness limiting portion 50 may be formed by bringing the fabric portions 33, 34 close to each other and connecting these, to limit the thickness of the thorax protecting portion 39 along the widthwise direction of the vehicle seat 12. In this case, a fabric sheet extends between the fabric portions 33, 34 and the fabric portions 33, 34 are connected ends of the fabric sheet.

<Regarding Folding of Airbag 30>

The airbag 30 in the flatly deployed state may be folded up in a manner different from that in the above embodiment.

For example, folding from the front toward the rear include the roll folding, the accordion-folding, and inward folding, or combination thereof.

The airbag 30 in the flatly deployed state may be folded up in any order different from that in the above embodiment.

<Regarding Gas Supply Port 61>

The present invention may be applied to a side impact airbag apparatus that has an airbag 30 without an inner tube 60. In this case, gas supply ports are located at positions different from those presented in the above description.

<Regarding Inflator Assembly 20>

Alternatively, the inflator assembly 20 may be entirely accommodated in the airbag 30 of the side airbag apparatus. Further, the inflator assembly 20 may be entirely arranged outside of the airbag 30. In the latter case, the inflator 21 and the airbag 30 may be connected to each other, for example, by a pipe, so that the inflation gas G discharged by the inflator 21 is supplied to the airbag 30 through the pipe.

<Regarding Storage Portion 15 of Airbag Module AM>

Instead of the seat back 14 of the vehicle seat 12, the storage portion 15 of the airbag module AM may be located in a part of the body side portion 11 that is in the vicinity of the outer side of the occupant P when seated in the vehicle seat 12.

<Object to be Protected by Side Airbag Apparatus>

The side airbag apparatus according to the present invention may be configured to protect any object as long as it protects at least the thorax PT of an occupant P. Therefore, the airbag apparatus according to the present invention may be configured to protect only the thorax PT. Also, in addition to the thorax PT, the airbag apparatus may protect at least one of the lumbar region PP, a shoulder, and the head.

<Other Modification>

The present invention can be applied to a side airbag apparatus that is used in a vehicle having a vehicle seat 12 arranged along a direction different from the vehicle widthwise direction, for example, along the front-rear direction. That is, when an impact is applied from the side to the vehicle seat 12 in such a vehicle (along the vehicle front-rear direction), the airbag apparatus of the present invention protects an occupant P from the impact.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus comprising an airbag that includes a thorax protecting portion for protecting the thorax of an occupant seated in a vehicle seat, wherein,
   the airbag is formed by stacking a pair of fabric portions in a widthwise direction of the vehicle seat and joining the fabric portions to form a bag-like shape, wherein the airbag is arranged beside the occupant in a folded state, and is inflated and deployed in a forward direction of the vehicle seat from the folded state,
   the thorax protecting portion includes:
   a gas supply port that supplies the inflation gas to the thorax protecting portion, thereby inflating the thorax protecting portion; and
   a thickness limiting portion that is formed by connecting the fabric portions to each other after bringing the fabric portions into one of a state in which the fabric portions contact with each other and a state in which the fabric portions are close to each other, at a position that is forward of the gas supply port and that corresponds to an arm of the occupant, wherein the thickness limiting portion limits the thickness of the thorax protecting portion in the widthwise direction of the vehicle seat, to prevent the thorax protecting portion from pushing the arm toward the thorax, and the thickness limiting portion has an arcuate portion that is curved to bulge toward a rear portion of the airbag,
   the thorax protecting portion is folded back along a folding line to be partitioned into a main protecting portion, to which the inflation gas is supplied from the gas supply port, and an auxiliary protecting portion, to which the inflation gas is supplied via the main protecting portion, wherein, before the airbag is folded, the folding line is located above the gas supply port and extends through the thickness limiting portion, and the rear end of the arcuate portion of the thickness limiting portion is located in the auxiliary protecting portion.

2. The side airbag apparatus according to claim 1, wherein the thickness limiting portion has a lower edge continuous with the arcuate portion, and the lower edge is inclined downward toward the front end.

3. A method for folding an airbag used in a side airbag apparatus, the airbag including a thorax protecting portion for protecting the thorax of an occupant seated in a vehicle seat, and the airbag being formed by stacking a pair of fabric portions in a widthwise direction of the vehicle seat and joining the fabric portions to form a bag-like shape, wherein
   the thorax protecting portion includes:
   a gas supply port that supplies inflation gas to the thorax protecting portion, thereby inflating the thorax protecting portion; and
   a thickness limiting portion that is formed by connecting the fabric portions to each other after bringing the fabric portions into one of a state in which the fabric portions contact with each other and a state in which the fabric portions are close to each other, at a position that is forward of the gas supply port and that corresponds to an arm of the occupant, wherein the thickness limiting portion limits the thickness of the thorax protecting portion in the widthwise direction of the vehicle seat, and the thickness limiting portion has an arcuate portion that is curved to bulge toward a rear portion of the airbag,
   the method comprising:
   forming an elongated body that extends in an up-down direction of the vehicle seat by folding the airbag; and
   folding, along a folding line, an upper portion of the elongated body in a downward direction, such that the folding line is located above the gas supply port and extends through the thickness limiting portion, and such that a rear end of the arcuate portion of the thickness limiting portion is located in the upper portion of the elongated body.

4. The method according to claim 3, wherein the forming the elongated body includes:

accordion-folding the rear portion of the airbag along a plurality of accordion-folding lines; and roll-folding a front portion of the airbag along a plurality of roll-folding lines.

* * * * *